United States Patent [19]

Spehner

[11] Patent Number: 5,494,748

[45] Date of Patent: * Feb. 27, 1996

[54] REINFORCEMENT FIBERS AND/OR PROCESS FIBERS BASED ON PLANT FIBERS

[75] Inventor: Jean L. Spehner, Strasbourg, France

[73] Assignee: Ecco Gleittechnik GmbH, Seeshaupt, Germany

[ * ] Notice: The portion of the term of this patent subsequent to Aug. 3, 2010, has been disclaimed.

[21] Appl. No.: 72,739

[22] Filed: Jun. 8, 1993

Related U.S. Application Data

[63] Continuation-in-part of Ser. No. 634,166, Dec. 14, 1990, Pat. No. 5,232,779.

[30] Foreign Application Priority Data

Apr. 17, 1989 [DE] Germany .......................... 39 12 615.3
Mar. 26, 1990 [DE] Germany .......................... 40 09 662.9

[51] Int. Cl.⁶ .......................... D02G 3/00; B32B 13/02; D21C 3/00
[52] U.S. Cl. .......................... 428/379; 428/381; 428/383; 428/402; 162/70
[58] Field of Search .................................. 428/379, 381, 428/383, 402; 162/70

[56] References Cited

U.S. PATENT DOCUMENTS

| | | | |
|---|---|---|---|
| 4,406,703 | 4/1983 | Guthrie et al. | 106/93 |
| 4,617,383 | 10/1986 | Jaskowski | 536/2 |
| 4,647,505 | 3/1987 | Blackie et al. | 428/396 |

FOREIGN PATENT DOCUMENTS 3008204  10/1981  Germany .

OTHER PUBLICATIONS

Organic Fillers, Benjamin M. Walker (1978).

*Primary Examiner*—Patrick J. Ryan
*Assistant Examiner*—Richard C. Weisberger
*Attorney, Agent, or Firm*—Steinberg, Raskin, & Davidson

[57] ABSTRACT

The invention relates to reinforcing and/or process fibers based on plant fibers, obtainable thereby that plant fibers from which the wood components have been removed by ultrasonic treatment are treated with an aqueous solution of at least one metal compound selected among metal oxides, hydroxides, carbonates, sulfates, thiosulfates, sulfites, silicates or phosphates, subsequently washed and treated with an inorganic or organic binding agent or the fibers which have not been washed are neutralized with a mineral acid or that plant fibers from which the wood components have been removed are treated with an oxidation agent or that non-pretreated plant fibers are treated at 250° to 350° C. with the controlled addition of air so that carbonization of the fibers takes place.

15 Claims, No Drawings

REINFORCEMENT FIBERS AND/OR PROCESS FIBERS BASED ON PLANT FIBERS

This application is a continuation-in-part application of U.S. Ser. No. 07/634,166, now U.S. Pat. No. 5,232,779, filed Dec. 14, 1990.

BACKGROUND OF THE INVENTION

The invention relates to reinforcement fibers and/or process fibers based on plant fibers, methods for their production, and their use.

It is known that asbestos fibers are frequently mixed to molded parts. Recently, major adverse health concerns have been expressed regarding the use of asbestos fibers. In spite of this disadvantage, these fibers continue to be used to a large extent because they provide significant advantages in many fields of application and genuine alternatives are not presently on the market at this time.

The same applies for glass fibers. Artificial fibers also are considered to have major adverse health concerns because they release toxic vapors at increased temperatures during breakdown reactions.

Attempts have also been made to find a substitute material for asbestos based on plant fibers. West German Patent DE-OS 30 08 204 describes a method for the production of reinforcing fibers in which the capillaries of the plant fibers are initially opened after an intermediate drying process, using a solution of sodium silicate containing formaldehyde. The plant fibers are subsequently impregnated with a slurry of lime and water. These treatment steps can also be carried out in reverse sequence. This method, however, has also not led to the desired success.

OBJECTS AND SUMMARY OF THE INVENTION

An object of this invention is to provide reinforcing and process fibers which have the advantageous properties of the asbestos fibers without having their deterlerious health disadvantages.

It is another object of the present invention to provide new and improved reinforcement fibers or process fibers which have been subjected to ultrasonic treatment such that wood components in the plant fibers are removed.

The task is solved by reinforcing and process fibers based on plant fibers obtainable through the following method.

The method for the production of the reinforcing and process fibers according to the invention is characterized in that:

a) the wood components and other undesired components of the plant are removed from the fiber-containing parts of the fiber plants, b) the plant fibers from which the wood components have been removed are treated, if desired, with an aqueous solution of at least one metal compound, selected from metal oxides, metal hydroxides, metal carbonates, metal sulfates, metal thiosulfates, metal sulfites, metal silicates or metal phosphates, that they are subsequently washed and treated with an inorganic or organic binding agent or that the non-washed fibers are neutralized with a mineral acid, or c) the plant fibers freed of wood components are treated, if desired with an oxidizing agent, or d) the raw, non-pretreated plant fibers are treated at 250° to 350° C. with controlled addition of air so that carbonization of the fibers takes place.

DETAILED DESCRIPTION OF THE INVENTION

All fiber plants are suitable for the production of the reinforcement and process fibers. However, vast fibers such as the stem fibers of flax, hemp, jute, nettle plants, the leaf fibers of the agave, the seed hair of, for example, cotton, and coconut shell fibers are preferred. Also, fibers obtainable from grasses, in particular from elephant grass which has a fiber component of approximately 50%, are usable.

The plant fibers in cut or uncut form must first be freed of wood components and other undesired plant components. This takes place by known and conventional methods, for example through roasting and decortication of green flax.

According to a preferred embodiment, the removal of the wood components takes place by breaking down the plant fibers with ultrasonic treatment in an aqueous medium. The length of the ultrasonic wave is not critical. It is chosen, depending on the apparatus, preferably so that optimum sound intensity is achieved and ultrasonic cavitation occurs.

A mixture of water with at least one polar organic solvent is preferably used as the aqueous medium. The organic solvents preferably used in the aqueous medium include a $C_1$ - to $C_4$ -mono-or di-alcohol, a $C_1$ - to $C_4$ -ketone, an ether miscible with water, or a mixture thereof. Especially preferred are methanol, ethanol, and acetone and mixtures thereof. The volume ratio of water to organic solvent lies preferably in a range from about 5:1 to about 1:5, particularly from about 3:1 to about 1:3.

The ultrasonic method is a particularly fast, simple and gentle method for removing the wood components and other undesired components of the raw plant fibers. The plant fibers obtained in this manner are not damaged mechanically and they possess the tear resistance of the original fiber. Since the other undesired plant components, in particular the binding agent, are also largely removed through the ultrasonic treatment, the fibers are highly compatible with other materials so that they can readily be taken up into a matrix. The plant fibers obtained after ultrasonic treatment are therefore suitable for the subsequently stated application fields even without further after-treatment.

Through the ultrasound treatment in an aqueous or organic medium, with or without additives, the bonding substances of the plant fibers in the plant starting material are dissolved. In addition, the adhesion of the constituent fibers with one another is partially or completely broken down so that a partial or complete splicing of the fiber bundles into constituent elemental fibers is effected.

Simultaneously, as a result of the ultrasound treatment, the effectiveness of organic or ionic additives, for example a tenside or a metal compound, in the ultrasound medium is increased. Additives, such as tensides, facilitate the wetting of the plant starting material with the ultrasonic medium and in this manner increase the degree of effectiveness of the ultrasonic treatment and thereby support the effect of the ultrasound to dissolve plant materials (such as, for example, adhesive or coloring means). Anionic tensides, such as sodium lauryl sulfate, are preferred. Through the addition of metal compounds of the above stated type in the ultrasound bath, simultaneously, an impregnation of the fibers takes place so that in comparison to the above stated process for the production of reinforcing and process fibers, one stage is saved. This results in economies of production.

The ultrasound treatment can be carried out on roasted, partially roasted or unroasted fiber-containing plant material, in particular straw which has not been pre-treated or has been mechanically, chemically or thermally pretreated. In addition, plant fibers obtained in other ways may be used, which show an insufficient decortication or splicing of the fiber bundles into constituent elemental fibers.

If the ultrasound treatment is carried out with plant straw, the latter is preferably rolled before treatment in the dry state, thereby the wood components are pre-broken and the access of the ultrasound medium to the plant fiber is facilitated.

If desired, the plant fibers can be freed in the dried or undried states after the ultrasound treatment from any wood components that adhere thereto. For these purposes, conventional machines and processes can be used, such as are customary in the textile industry, for example beating or carding or other suitable decortication processes matching with the ultrasonic treatment.

This decortication can technically be brought about through combing, scutching, centrifuging or stripping off the woody components or through a combination of these methods. Thereby, the elemental fibers undergo a partial or complete process of being laid bare and a parallel orientation of the fiber product is brought about.

In a preferred embodiment, the process in accordance with the invention is applicable in particular with flax and hemp.

The fibers obtained can also be used for the production of printed circuit boards and in the field of medicine and hygiene, for example for plaster casts, diapers and tampons.

If desired, the fibers from which the wood components have been removed, e.g., by the effect of ultrasound, can subsequently be treated with the aqueous solution of a metal compound. This solution contains, in particular, about 1 to about 30% by weight, especially preferred are about 10 to about 30% by weight, of the metal compound relative to the total weight of the solution. The treatment preferably takes place at a temperature of from about 50° to about 100° C.

If necessary, the fibers are subsequently washed with, and possibly dried and treated with, the binding agent or they are neutralized with a mineral acid, in particular hydrochloric acid, phosphoric acid or sulfuric acid, possibly dried and treated with the binding agent.

Preferred metal compounds are alkali oxides or alkaline earth oxides, hydroxides, carbonates, thiosulfates or sulfates as well as basic iron salts, titanium salts, antimony salts or aluminum salts. Particularly preferred are alkali or alkaline earth hydroxides, alkali metasilicates, and alkali thiosulfates, for example, sodium or potassium hydroxide, sodium metasilicate and sodium thiosulfate.

The binding agents used in the present invention are, in particular, cement, gypsum, silicates, alkali or alkaline earth salts of mineral acids, bitumen, asphalt, natural and synthetic elastomers, polyurethanes, phenolic resins, resols, melanine resins, epoxy resins or their mixtures.

Use of these binding agents can take place in aqueous or organic medium (solvent). The quantity of binding agent is preferably from about 5% to about 20% by weight relative to the fiber fraction.

The fibers are impregnated with an aqueous or organic solution or suspension of the binding agent by, for example, immersing them in the solution or suspension, or they are sprayed with it. The impregnation preferably takes place at room temperature. Subsequently drying takes place.

Instead of the fibers obtained in the above described manner, it is also possible to treat the fiber components resulting from the working of the flax directly with the binding agent.

Depending on the application purpose of the fibers, additional treatment stages can also be provided according to the invention. If, for example, a light fiber is desired, a bleaching process can be included after the pretreatment of the fibers. For this purpose the fibers are treated in the customary manner at room temperature or at increased temperature with a peroxide or hypochlorite solution or with chlorine water and subsequently rinsed with water.

If a tribologic effect is desired, a solid lubricant can be added. Suitable solid lubricants are for example molybdenum disulfide, graphite, zinc sulfide, tricalcium phosphate, titanium oxide and the like.

If an additional flame-retardant finish is desired, a flame-retardant compound such as an antimony oxide, iron sulfate, alum, bismuth oxide, urea phosphate or chloroparaffin can be added thereto.

As a means of preservation a bactericide, such as a heavy metal salt or a choropherol compound, can be added thereto.

The fibers according to the invention, in particular the fibers obtained after the ultrasonic treatment, can also be made water repellent for example with a fluoro-copolymer, paraffin, polysilane, reactive waterproofing agents (silanes, isocyanates), zirconium salts, or zinc salts.

As already mentioned above, in a further variant of the method according to the invention, plant fibers which still contain the organic components (wood components, sugar substances, pectins) can be pyrolized. Therein, they are subjected to a treatment at a temperature of from about 250° to about 350° C. with the controlled addition of air. Therein, the plants do not burn but rather they are carbonized. For example, the fibers are heated while being vigorously mixed in a tube furnace heated from the outside. The developing gases are drawn off and access of air is regulated so that no burning and a pressure reduction from approximately 0.1 to 0.05 bars takes place. Alternatively, inert gases such as carbon dioxide, nitrogen, nitrogen/hydrogen etc., can be introduced in order to lower the oxygen content. It is also possible to work in an essentially pure inert gas atmosphere.

The heating time is chosen so that the degree of carbonization is approximately 20 to 80%, in particular 20 to 60%. Surprisingly, in this manner a fiber is obtained without pretreatment which in particular fields of application can replace fibers harmful to the environment.

The fiber obtained through pyrolysis is relatively brittle and can very easily be crushed so that the fiber is present as microfiber. This can be shown in conjunction with the specific surface (according to Blaine-Dyckerhoff) and the density.

|  | Specific Surface $(cm^2/g)$ | Density $g/cm^3$ |
| --- | --- | --- |
| Fibers pyrolized according to the invention (obtained from flax) | 6100 | 1.58 |
| Asbestos | 9900 | 2.5 |
| Flax fiber (untreated, cut) | 2000 | 1.46 |

If desired, the fibers obtained through pyrolysis can still be impregnated by immersing the same in a solution of a resin, synthetic or natural rubber or elastomer, or spraying them with the solution. This impregnation serves the purpose of facilitating the wetting and processing of the fiber.

According to the further embodiment of the method according invention, the plant fibers are subjected to a chemical oxidation. For this purpose, the plant fibers from which the wood components had been removed and which had been usefully cut to a length of approximately 3 mm to about 10 mm are treated with an aqueous solution of an oxidation agent. As oxidation agent are suitable in particular, alkali metal periodates, alkali metal persulfates, preferably alkali metal permanganates, and in particular potassium permanganate.

The fibers are wetted with the oxidation solution, for example by spraying, impregnation and the like. Treatment takes place at a temperature of approximately 60° C. up to the boiling point of the solution, preferably at approximately 80° C. to about 95° C., and in particular at about 85° C. to about 95° C.

After the oxidation, which in general is completed after a few minutes, the fibers are washed and dried. Drying takes place at temperatures up to a maximum of about 140° C.

The oxidized fibers have low inflammability and possess advantageous tribological properties.

Yarns can also be oxidized. In an embodiment utilizing yarns, the oxidation process must be controlled so that the yarn is not destroyed. This takes place via the concentration of the oxidation solution and the contact time with the oxidation solution as well as through a subsequent reduction of the treated fibers with a conventional reducing agent, for example sodium sulfite.

In the following, application fields for the fibers according to the invention will be illustrated;

In the cement fiber industry, the "mineralized" fibers according to the invention are useful for the production of, for example, cement plates and molded cement parts. For this purpose the fibers are treated as discussed above, cut to a length of for example 4 to 8 mm, and treated with a metal compound as described above. The working of the fibers into the cement takes place in conventional manner, for example by adding and mixing them into the cement or into the prepared concrete mixture.

In analogous manner gypsum plates and molded gypsum parts can be produced. The use of the mineralized plant fibers in this case is not absolutely necessary because the mineralization can take place during the use of the plant fibers in the gypsum paste. The length of the fibers depends on the desired mechanical strength of the gypsum parts.

For the production of gypsum for medical purposes the fibers are additionally bleached as described above, which simultaneously effects a disinfection.

For the production of roughcast and filler based on gypsum and glue, or water soluble resins, the pretreated fibers are used together with a conventional means of preservation. In this case, also the desired strength is of decisive importance for the length of the fibers being used.

The fibers according to the invention are also suitable for use in the production of sound proofing materials, such as machine sheathing and substances for the underseal of motor vehicles and for use in sealers, roof panels, and street coating. For this purpose they are premixed, for example with bitumen/rubber dust, asphalt, and epoxy resins. The length of the fiber depends on the method of application. For coatings to be sprayed on, the length of the fibers should not exceed about 10 mm, whereas the length of the fibers for coatings to be applied by a spatula can be about 20 mm to about 50 mm.

The fibers according to the invention are particularly suitable as additions to phenoplasts or thermoplastic synthetic materials, in particular in the production of molded parts of synthetic material.

The pyrolized and the oxidized fibers are particularly advantageous for insulating materials and friction linings comprising an agglomerate of several components and are pressed under pressure and increased temperatures. The fibers according to the invention therein serve for ensuring an optimum distribution and homogenous mixture of the numerous individual components which have very different densities. The pyrolized and oxidized fibers can also be used for improving the flowability of cement, synthetic materials, etc. Due to their tribolic properties, they can also be used for the production of technical papers.

The fibers according to the invention (including the oxidized fibers) can also be used in the form of threads or tissues in phenoplasts or thermoplastic synthetic materials which are processed to form slide and wearing parts and pressed machine parts such as brake bands, clutches and friction lining. They lend to the molded parts excellent mechanical properties such as tensile strength, tear resistance and flexural strength.

In the paper and cardboard industry, bleached or unbleached fibers according to the invention are used. For this purpose they are preferably impregnated with a resin solution (sizing) comprising resin, soaps, sodium silicate, and casein. In the same way, the fibers according to the invention can also be used in the production of felt.

The fibers according to the invention can also be used for the production of polishing agents. For this purpose, fibers of approximately 2 to 4 mm length are soaked in wax or a rubber solution and subsequently are formed into beads via an extruder. As waxes there can be used for example beeswax, synthetic hard waxes, plant waxes such as carnauba wax, candelilla wax and the like. Depending on the type of wax, the ratio of wax to fiber is in the range of about 3 g to about 5 g of wax per 1 g fiber. Through appropriate choice of wax the hardness and the thermal stability of the beads can be influenced.

The rubber solution of natural or synthetic rubber, dissolved in a solvent, for example methylene chloride and hydrocarbons such as xylene and toluene, as well as latex, are usable. Latex can also be applied in an aqueous medium.

The fiber beads impregnated with wax or rubber are used in particular as drum material for cleaning and polishing different materials (leather, wood, metal). They can also be used as blasting material in jet cleaning processes (for example sand blastings). The fiber beads impregnated with rubber can advantageously also be worked into molding compounds. They do not produce dust and are better anchored in the matrix in the presence of resins or in the reinforcement of elastomers.

DETAILED DESCRIPTION OF THE PREFERRED EMBODIMENTS

The following examples are given to further illustrate the present invention. The scope of the invention is not, however, meant to limit to the specific details of the examples.

EXAMPLE 1

Green flax fibers have wood components removed by roasting and decortication. 100 kg of the fibers from which the wood components have been removed were stirred in a 5% aqueous sodium hydroxide solution for 30 minutes at 60° C. The fibers were isolated and neutralized by being sprayed with 10% phosphoric acid. Subsequently the fibers are dried in a hot air stream, for example in a fluidized bed.

EXAMPLE 2

The process described in Example 1 is repeated. However, after the treatment of the fibers with a solution of sodium hydroxide the fibers are isolated, washed with water, and subsequently sprayed with cement sludge.

EXAMPLE 3

100 kg cut green flax fibers are heated at 280° to 300° C. in an oven while being vigorously stirred. The gases formed are drawn off and replaced by fresh air in such a way that no burning occurs. Heating is continued until the desired degree of carbonization, for the example 80%.

EXAMPLE 4

800 g of flax fibers from which the wood components have been removed are impregnated with a solution of 300 g potassium permanganate in 3.5 liters of water with a temperature of 90° to 93° C. After 3 to 4 minutes foam forms, at which point the oxidation process is completed. Subsequently the oxidation agent is drawn off and the flax fibers are washed several times with water. After the washing fibers are dried at approximately 110° to 120° C.

The oxidized fibers have a density of 3.5 g/cm$^3$ and a specific surface according to Brain Dyckerhoff of 8600 cm$^2$/g.

Distribution of length of the oxidized fibers:

| | |
|---|---|
| 80% | between 10 and 500 μm |
| 5% | between 1 and 2 mm |
| 12.5% | between 2 and 3 mm |
| 2.5% | >3 mm |

Distribution of thickness of the oxidized fibers:

| | |
|---|---|
| 20% | between 5 and 8 μm |
| 25% | between 10 and 26 μm |
| 17.5% | between 30 and 32 μm |
| 25% | >40 μm (between 50 and 500 μm) |

EXAMPLE 5

Raw flax stems, only superficially decorticated, are cut to a length of about 10 cm and immersed in a mixture of 50% water and 50% ethanol (v/v) and subjected at room temperature to ultrasonic treatment. The ultrasound generator was set to about 700 kHz at a power of 50 Watt/cm$^2$ via a piezoelectric configuration. The breakdown was complete after about 10 minutes and the bath temperature increased by about 30° C. The fibers were subsequently isolated and dried in a hot air stream.

EXAMPLE 6

Dry flax straw, unroasted or partially roasted, is rolled, for which purpose preferably roller pairs are used. The rolling can take place dry or in the ultrasound medium directly before the ultrasound treatment. Subsequently, the straw is passed by the source of sound with a suitable conveying device, for example a belt studded with metal pins.

The source of the sound is, for example, an immersion sound source with the built-in dimensions 558×158×90 mm, an ultrasound power of 500 Watts and 12 transducer elements. The ultrasound medium is tap water to which is added 1% of a tenside and which is kept with a thermostat at a temperature of about 70° C. The straw is carried past the sound source in parallel or random orientation. The distance of the conveying device from the sound source as well as the speed of the passage are variable. For example, this distance is about 2 cm and the speed is about 5 mm/second.

After the ultrasound treatment, the straw is dried in suitable processing, for example with a hot-air belt drier, and subsequently carried to a combing machine. The combing machine frees the fiber of woody components still adhering and brings about the partial or complete laying-free of the elemental fibers.

The combing process can take place immediately after the drying or after any given time interval.

EXAMPLE 7

Synthetic material reinforcement

In an application of the method in accordance with the invention, the flax fibers prepared according to Example 6 are shortened mechanical to a given length, for example, less than about 4 mm. Subsequently, the fiber is treated with polybutene at a ratio by weight of about 3:1 and granulated.

In an extruder, the granulate and polyamide are mixed at a ratio by weight of about 1:10 and a fiber-reinforced synthetic granulate is thus obtained. This granulate is further processed in an injection molding process to form synthetic formed parts, for example for packagings or office supplies.

The fibers treated by ultrasound are especially well suited for this application purpose since the splicing of the fiber bundles into elemental fibers brings about a good anchoring of the fiber in the material.

EXAMPLE 8

Production of Fleece

The flax fiber prepared according to Example 7 is further processed in untreated form or in a form pretreated for a particular application purpose of the fleece, for example hydrophobized, to form a flax fleece or mixed flax fleece.

The fibers treated by ultrasound are especially well suited for this application purpose since the splicing of the fiber bundles into elemental fibers effects a good hooking of the fibers with one another and consequently a good strength.

The natural bleaching of the flax fibers by dissolving out the coloring substances in the ultrasound treatment makes possible the use of the flax fleece for applications in which low intrinsic coloring without the use of bleaching agents is critical, for example for plaster casts, diapers or tampons.

The examples provided above are not meant to be exclusive. Many other variations of the present invention would be obvious to those skilled in the art, and are contemplated to be within the scope of the appended claims.

I claim:

1. Reinforcement fibers and/or process fibers based on plant fibers obtained by removing wood components and other undesired components from fiber-containing parts of the plant fibers, treating the plant fibers from which the wood components have been removed with an aqueous solution of at least one metal compound selected from a group consisting of metal oxides, metal hydroxides, metal carbonates, metal sulfates, metal thiosulfates, metal sulfites, metal silicates, metal phosphates and mixtures thereof, and thereafter washing and treating said fibers with an inorganic or organic binding agent; or neutralizing said fibers with a mineral acid after said fibers have been treated with said at least one metal compound and have not been washed, such that a product is obtained in which said at least one metal compound is distributed between said fibers in an unreacted form; or oxidizing said fibers from which the wood components have been removed by treating said fibers with an oxidation agent; or carbonizing said non-pretreated plant fibers by heating said fibers to a temperature from about 250° C. to about 350° C. with the controlled addition of air such that carbonization of said fibers takes place.

2. Reinforcement fibers or process fibers derived from plant fibers which have been subjected to ultrasonic treatment such that wood components are removed from said plant fibers.

3. Fibers according to claim 2, wherein said plant fibers are selected from a group consisting of flax, jute, nettle, hemp, cotton and sisal fibers.

4. Fibers according to claim 2, wherein said plant fibers being bleached after the ultrasonic treatment by treatment with peroxides, hypochlorite or chlorine water.

5. Fibers according to claim 2, wherein said plant fibers being finished with an agent for providing flame retardation, a solid lubricant or a preservative.

6. Fibers according to claim 5, wherein the fibers have been removed from contact with the wood components.

7. Fibers according to claim 2, wherein said ultrasonic treatment is carried out at a temperature in a range of about −20° C. to about 100° C.

8. Fibers according to claim 7, wherein said ultrasonic treatment is carried out at a temperature in a range of about 20° C. to about 100° C.

9. Fibers according to claim 1, wherein the ultrasonic treatment is carried out in the presence of at least one additive.

10. Fibers according to claim 9, wherein said additive is a tenside.

11. Fibers according to claim 1, wherein the ultrasonic treatment is carried out in an aqueous medium.

12. Fibers according to claim 11, wherein the aqueous medium is selected from the group consisting of water and a mixture of water and a polar organic solvent.

13. Fibers according to claim 11, wherein the aqueous medium is a mixture of water and a polar organic solvent, said organic solvent is a $C_1$- to $C_4$- mono- or di- alcohol, a $C_1$- to $C_4$- ketone or an ether miscible with water.

14. Fibers according to claim 13, wherein the organic solvent is selected from a group consisting of methanol, ethanol, acetone and mixtures thereof.

15. Fibers according to claim 1, wherein the ultrasonic treatment is carried out in the presence of at least one metal compound.

* * * * *